(12) United States Patent  
Kawasaki et al.

(10) Patent No.: US 8,099,136 B2  
(45) Date of Patent: Jan. 17, 2012

(54) PORTABLE TERMINAL

(75) Inventors: Shinichiro Kawasaki, Kawasaki (JP); Yoshiaki Morimoto, Kawasaki (JP); Jun Maeoka, Kawasaki (JP)

(73) Assignee: Hitachi, Ltd., Tokyo (JP)

(*) Notice: Subject to any disclaimer, the term of this patent is extended or adjusted under 35 U.S.C. 154(b) by 0 days.

(21) Appl. No.: 12/698,846

(22) Filed: Feb. 2, 2010

(65) Prior Publication Data

US 2010/0197357 A1 Aug. 5, 2010

Related U.S. Application Data

(63) Continuation of application No. 11/475,326, filed on Jun. 27, 2006, now abandoned, which is a continuation of application No. 10/721,576, filed on Nov. 25, 2003, now abandoned.

(30) Foreign Application Priority Data

Aug. 7, 2003 (JP) .................................. 2003-206388

(51) Int. Cl.  
*H04M 1/00* (2006.01)

(52) U.S. Cl. ...................... 455/566; 455/414.1; 455/405; 455/406

(58) Field of Classification Search .... 455/414.1–414.4, 455/412.1, 405–406, 566; 379/209.01  
See application file for complete search history.

(56) References Cited

U.S. PATENT DOCUMENTS

| 5,301,359 | A * | 4/1994 | Van den Heuvel et al. ... 455/524 |
| 6,714,797 | B1 | 3/2004 | Rautila ....................... 455/552.1 |
| 6,804,537 | B1 | 10/2004 | Fujii ............................. 455/557 |
| 6,898,432 | B1 | 5/2005 | Jiang ........................... 455/456.1 |
| 2002/0183038 | A1 | 12/2002 | Comstock et al. ............. 455/406 |
| 2003/0134589 | A1* | 7/2003 | Oba .............................. 455/3.03 |
| 2003/0177219 | A1 | 9/2003 | Taib et al. ...................... 709/223 |
| 2004/0068570 | A1 | 4/2004 | Haller ........................... 709/228 |
| 2004/0172365 | A1 | 9/2004 | Murakami et al. .............. 705/52 |
| 2005/0203992 | A1 | 9/2005 | Tanaka et al. .................. 709/203 |

FOREIGN PATENT DOCUMENTS

| EP | 1209930 | 4/2006 |
| JP | 2002-101462 | 4/2002 |
| JP | 2002-135464 | 5/2002 |
| JP | 2002-281062 | 9/2002 |
| JP | 2002-369053 | 12/2002 |
| JP | 2002-369174 | 12/2002 |
| JP | 2003-018317 | 1/2003 |
| WO | 01/89155 | 11/2001 |

* cited by examiner

*Primary Examiner* — Kamran Afshar  
*Assistant Examiner* — Dung Lam  
(74) *Attorney, Agent, or Firm* — Volpe and Koenig, P.C.

(57) ABSTRACT

A portable terminal displays on a selection screen not only contents stored in the portable terminal but also contents stored in a contents server communicatable via a network with the portable terminal. The selection screen displays information regarding the size and location of each of the contents, as well as estimated time and cost required to obtain each of the corresponding contents based on information regarding communication speed and communication path such as communicatable areas. The portable terminal is also equipped with a function to search another communication path that becomes available when moving the portable terminal to another location, and a function to suggest to obtain the contents using such a communication path if the new communication path provides faster and/or more inexpensive connection.

11 Claims, 7 Drawing Sheets

| Content Name | Content Type | Location | Time to obtain | Communication Cost to obtain |
|---|---|---|---|---|
| AAA | Music | Mobile | 0 sec. | 0 Yen |
| BBB | Moving Picture | Home | 120 sec. | 20 Yen |
| CCC | Program | Home | 80 sec. | 12 Yen |
| ... | ... | ... | ... | ... |
| YYY | Music | Mobile | 0 sec. | 0 Yen |

| Content Name | Data Format | Size | Actual Data | No. of Reproduction |
|---|---|---|---|---|
| AAA | MP3 | 13.4Kb | — | 2 |
| BBB | MPEG | 204.3Kb | — | 0 |
| ... | ... | ... | ... | ... |
| YYY | MP3 | 20.8Kb | — | 4 |

| Content Name | Data Format | Size | No. of Reproduction | Location |
|---|---|---|---|---|
| AAA | MP3 | 13.4Kb | 2 | Mobile & Home |
| BBB | MPEG | 204.3Kb | 0 | Home |
| ... | ... | ... | ... | ... |
| YYY | MP3 | 20.8Kb | 4 | Home |
| ZZZ | MP3 | 16.8Kb | 1 | Mobile |

| No. | Provider | Communication Method | Location of Base Station | Communication Speed | Communication Range | Fee Charge Method |
|---|---|---|---|---|---|---|
| 1 | Mobile Carrier Company A | cdmaOne | Optional | 32Kbps | Optional | 3 Yen / 1M |
| 2 | HotSpot Carrier Company B | IEEE 802 11.b | Long. 136.4 E Lat. 47.3 N | 18Mbps | 50m | 1 Yen / 1 M |
| ... | ... | ... | ... | ... | ... | ... |
| 10 | Home | IEEE 802 11.b | Long. 136.3 E Lat. 47.9 N | 18Mbps | 30m | Free |
| 11 | Home | Via-Charger Communication | Long. 136.3 E Lat. 47.9 N | 100Mbps | When connected to Charger | Free |

| Content Name | Content Type | Location | Time to obtain | Communication Cost to Obtain | Content Fee | Ad |
|---|---|---|---|---|---|---|
| AAA | Moving Picture | Company A's Site | 210 sec. | 15 Yen | 500 Yen | No |
| BBB | Music | Company A's Site | 80 sec. | 3 Yen | 100 Yen | No |
| CCC | Program | Mobile | 0 sec. | 0 Yen | 0 Yen | No |
| ... | ... | ... | ... | ... | ... | |
| ZZZ | Moving Picture | Mobile | 120 sec. | 12 Yen | 0 Yen | Yes |

| Content Name | Data Format | Size | No. of Reproduction | Location | Content Fee | Ad |
|---|---|---|---|---|---|---|
| AAA | MP3 | 13.4Kb | 2 | Mobile & Company A' Server | 500 Yen | No |
| BBB | MPEG | 204.3Kb | 0 | Company A' Server | 100 Yen | No |
| ... | ... | ... | ... | ... | 0 Yen | No |
| YYY | MP3 | 20.8Kb | 4 | Company A' Server | ... | |
| ZZZ | MP3 | 16.8Kb | 1 | Mobile | 0 Yen | Yes |

| Content Name | Content Type | Location | Acquisition Route | Time to obtain | Communication Cost to Obtain | Distance to move |
|---|---|---|---|---|---|---|
| AAA | Music | Mobile | — | 0 sec. | 0 Yen | — |
| BBB | Moving Picture | Home | Telephone Communication | 240 sec. | 150 Yen | — |
| BBB | Moving Picture | Home | Wireless LAN | 120 sec. | 20 Yen | — |
| BBB | Moving Picture | Home | Via-Charger | 10 sec. | 0 Yen | 5 min. on foot |
| ... | ... | ... | ... | ... | ... | — |
| YYY | Music | Mobile | — | 0 sec. | 0 Yen | — |

PORTABLE TERMINAL

CROSS-REFERENCE TO RELATED APPLICATIONS

This application is a continuation of application Ser. No. 11/475,326, filed on Jun. 27, 2006, which is a continuation of application Ser. No. 10/721,576, filed on Nov. 25, 2003, which is now abandoned, and claims the benefit of priority under 35 USC 119 of Japanese patent application no. 2003-206388, filed on Aug. 7, 2003, the contents of all of which are incorporated herein by reference.

BACKGROUND OF THE INVENTION

1. Field of the Invention

The present invention relates to a portable terminal that can obtain contents such as music, pictures and programs through a plurality of communication paths, and more particularly to a method for selecting contents that a user wishes to reproduce or execute and a method for selecting a communication path to obtain contents.

2. Related Background Art

Portable terminals as represented by portable telephones and PDAs are widely used and have evolved into information terminals with numerous additional functions, such as voice communication, e-mail, Web access, photographing, reproducing music, reproducing pictures and executing programs. Keeping pace with the increase in functionality of portable terminals, the size of contents that can be used on such portable terminals is growing larger. When such large contents are downloaded to portable terminals, the following problems have been occurring: (1) it takes too much time to obtain contents, (2) the cost for communications is expensive and unclear. As new communication methods such as wireless LAN, Bluetooth and infrared are adopted for use on portable terminals, communication costs are likely to become even more incomprehensible to users.

Some methods have been conceived to cope with such problems. For example, one of the methods suggests a so-called via-charger communications method, in which inexpensive broadband wire communications that are currently being installed in homes in increasing numbers are utilized to download contents from a contents source to a contents server installed at home. When a user of a portable terminal comes home, and starts charging the portable terminal at home, the time spent on charging the portable terminal is used to transfer the contents from the contents server to the portable terminal. Through this, the amount of time required to obtain contents from the contents source can be shortened, and therefore communication costs can be reduced.

In another method (second method), a moving picture distribution server is provided with a function to select an optimal communication path from among a plurality of communication paths to thereby realize a reduction in communication costs and a guarantee of bandwidth. Furthermore, whether to give priority to either communication costs or communication speed is registered for each subscriber, so that, based on the subscriber's preference, which of the communication cost reduction and the bandwidth guarantee should be given priority can be designated when selecting the communication path.

In order to cope with the problem (2) described above, still another method (third method) suggests a method for downloading updated fee charge information corresponding to changes in fee charge status of communication costs from an external source to the portable terminal and using the information to display an accurate communication cost. This method especially elaborates on a method for accurately calculating communication costs when a discount is applicable during certain communication hours.

Since current portable terminals are multifunctional and have a plurality of communication paths, an appropriate communication path must be selected for each situation. Some communication paths are usable only in a specific area, such as wireless LAN that is usable only in a business establishment, office or a home, while some communication paths are usable only at home, such as the via-charger communications method, as in the first method described above.

However, since data in the home contents server cannot be obtained while the user is out according to the first method described above, there is a limit to contents that are available for use from the portable terminal.

A method to access the home contents server via a public telephone line while the user is out and thereby access data is conceivable. However, the user in this instance has no way of knowing how much the communication would cost and how long the communication time would be, which makes it difficult for the user to determine if he or she should elect to obtain contents via the public telephone line or elect to obtain contents via charger upon arriving home.

Furthermore, the first and second methods described above do not take into consideration locally usable communication paths and therefore do not offer opportunities for a user to use inexpensive and/or high-speed communication paths by moving to another location with his or her portable terminal.

In addition, the user himself or herself cannot decide which communication path to use when he or she obtains contents according to these methods. In the second method described above, the path that matches the user's preference according to individual priority registered in the subscriber database is selected, but adapting to changes in user's preference is difficult and communication costs are difficult for the user to understand when he or she uses contents with this method.

Although the user is accurately notified of communication costs according to the third method described above, this method displays the accurate communication cost only after communication has taken place and does not display estimated communication cost before communication takes place. Consequently, this method entails the problem of the user's not being able to select the communication path before the communication actually takes place.

The problems described above can be summarized in the following two points:

1. For users of portable terminals with a plurality of communication paths, the amount of time and costs required to obtain contents are unclear.

2. For users of portable terminals with a plurality of communication paths, it is difficult to select a communication path though which contents can be obtained more advantageously.

SUMMARY OF THE INVENTION

In order to solve the problems described above, in accordance with an embodiment of the present invention, a portable terminal is equipped with a function for viewing and hearing or executing contents and a plurality of communications functions such as wireless and/or wired communications. The portable terminal is provided with a contents selection method for presenting to a contents user a list that includes locations of contents that may be selected by the user, and estimated communication cost and estimated communication time required to obtain contents from the current position of the portable terminal.

Furthermore, when the user can use a communication path with shorter communication time or lower communication cost by moving to another location with the portable terminal, the portable terminal has a function to suggest such a move to the user.

Other features and advantages of the invention will be apparent from the following detailed description, taken in conjunction with the accompanying drawings that illustrate, by way of example, various features of embodiments of the invention.

DETAILED DESCRIPTION OF PREFERRED EMBODIMENTS

Figure 1:
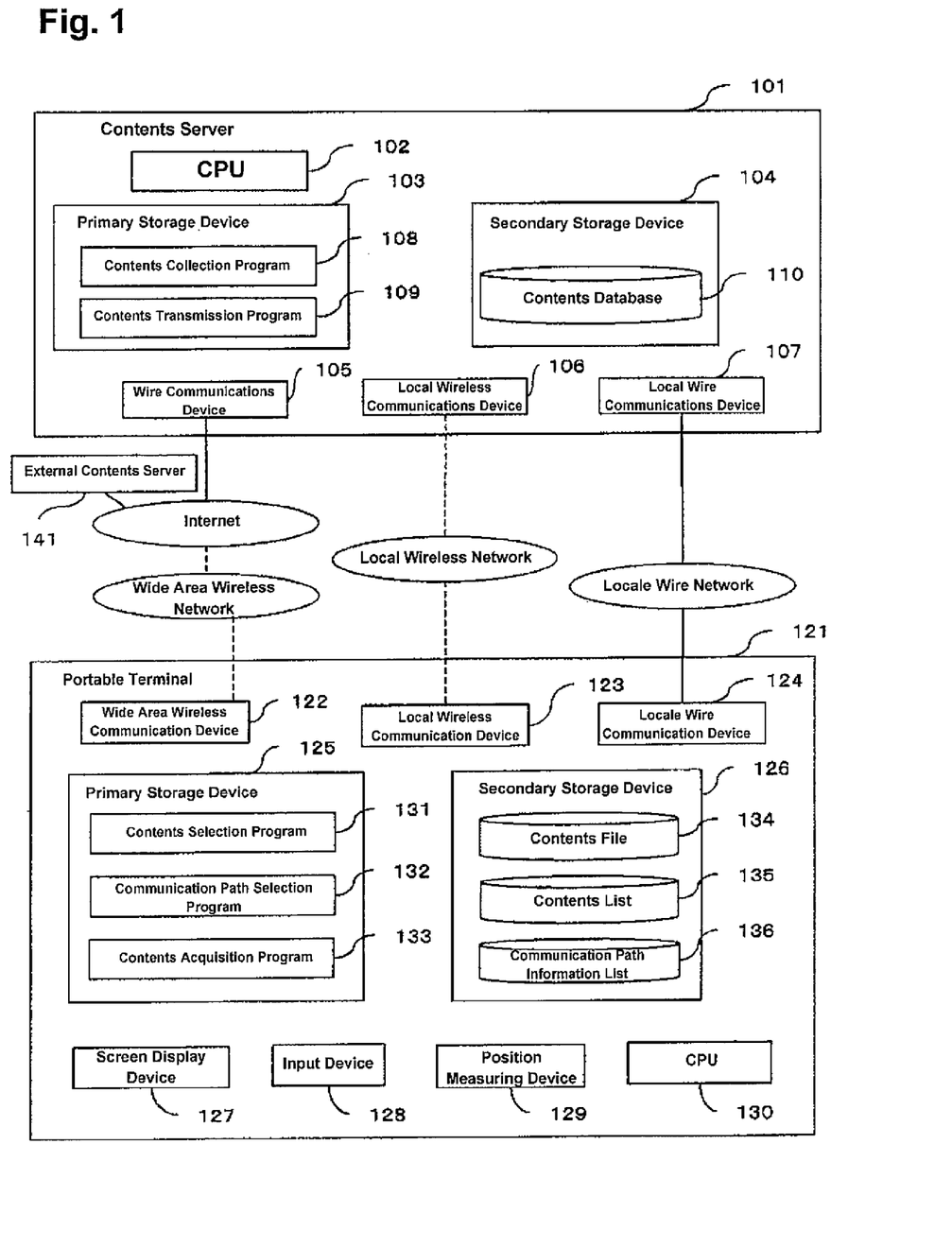
FIG. 1 is a diagram of a system configuration in accordance with a first embodiment of the present invention.

Referring to FIGS. 1 through 8 and 12, a first embodiment of the present invention will be described. FIG. 1 shows the overall configuration of a system in accordance with the first embodiment of the present invention.

The system of the present embodiment is generally formed from a contents server 101 and a portable terminal 121, which are connected via a plurality of networks, such as, for example, the Internet, a wide area wireless network, a local wireless network, and a local wire network. The contents server 101 and the portable terminal 121 do not have to be connected at all times and may be instead connected using one of the communication paths depending on the position of the portable terminal 121 and when communication is required.

An example of wide area wireless network is a wireless communications network that is currently used for portable telephones and PHSs. An example of local wireless network is wireless LAN that is installed in individual homes and business establishments. Local wireless networks in general can communicate at higher speed than wide area wireless networks, but are limited in the area in which communication can take place. An example of local wireless network may involve the via-charger communication system of the first method described in the related art section above. According to this method, the trouble of connecting to a wire network is eliminated by setting a portable terminal in a charger for charging purposes and at the same time connecting to a communications line. Another example of local wire network may involve a method in which a user manually connects an Ethernet® cable to a portable terminal for a wire communication. Such wire communications require cable connections for communication, but generally have higher communication speed than wireless communication.

The contents server 101 is an apparatus that stores numerous contents, such as music data and moving picture data that are supplied to the user. An example of the present embodiment will be described with reference to a system in which a contents server owned by an individual is installed in the individual's home.

The contents server 101 includes a central processing unit 102, a primary storage device 103, a secondary storage device 104, a wire communications device 105, a local wireless communications device 106, and a local wire communications device 107.

The contents server 101 communicates with an external contents server 141 or the portable terminal 121 via networks by using such communications devices as the wire communications device 105, the local wireless communications device 106 and the local wire communications device 107.

The central processing unit 102 runs programs installed in the primary storage device 103 to realize such processing as collecting contents from an external source and sending contents to the portable terminal 121.

A contents collection program 108 and a contents transmission program 109 are installed in the primary storage device 103. The contents collection program 108 is connected to the external contents server 141 via the wire communications device 105 and obtains contents that are indicated in advance by a user or contents that match the user's preferences. In the secondary storage device 104 is installed a relatively large capacity contents database 110, where contents collected are stored. The details of the contents database 110 are described below using FIG. 3.

The contents transmission program 109 receives requests for contents from the portable terminal 121, retrieves the contents from the contents database 110, and sends the contents to the portable terminal 121.

The portable terminal 121 includes a wide area wireless communications device 122, a local wireless communications device 123, a local wire communications device 124, a primary storage device 125, a secondary storage device 126, a screen display device 127, an input device 128, a position measuring device 129, and a central processing unit 130.

The wide area wireless communications device 122, the local wireless communications device 123 and the local wire communications device 124 are devices for communicating via the networks described earlier. The present invention is applicable to portable terminals with two or more communications devices. The present embodiment example concerns a portable terminal with the three communications devices described above.

A contents selection program 131, a communication path selection program 132, and a contents acquisition program 133 are installed in the primary storage device 125. The contents to be obtained are determined using these programs, and the contents are obtained from the contents server 101.

The secondary storage device 126 stores such data as a contents file 134, a contents list 135 and a communication path information list 136. The contents file 134 is a data region for storing the substance of contents obtained by the portable terminal 121, such as music data, moving picture data and program binary data. Regions of secondary storage devices mounted on portable terminals are generally smaller in capacity than contents servers that are, not portable. Consequently, the contents file 134 cannot store as much contents as the contents database 110.

The contents list 135 and the communication path information list 136 are used to obtain contents according to the present invention. The contents list 135 is not the substance of contents, but rather data of information regarding contents that the contents server 101 or the portable terminal 121 has, and the data is updated when the portable terminal 121 establishes wire connection with the contents server 101 or obtains contents. The details regarding the contents list 135 will be described below using FIG. 4. The communication path information list 136 contains information regarding communication paths that utilize communications devices of the portable terminal 121. The details of the communication path information list 136 will be described below using FIG. 5.

The screen display device 127 and the input device 128 are used to reproduce contents such as moving pictures, in addition to being used by a user to make selections and decisions regarding contents obtained.

The position measuring device 129 is a device that recognizes the current position of the portable terminal 121. Examples of the position measuring device 129 include an apparatus that obtains latitude and longitude of the portable terminal 121 using a GPS, an apparatus that detects the position of the portable terminal 121 based on base station ID, and an apparatus that detects whether the portable terminal 121 is connected to a charger.

The central processing unit 130 drives various programs 131-133 stored in the primary storage device 125 and obtains contents using the various devices. Additionally, the central processing unit 130 may be used to realize other functions of the portable terminal 121, such as a voice communication function and a contents reproduction function.

Figure 2:
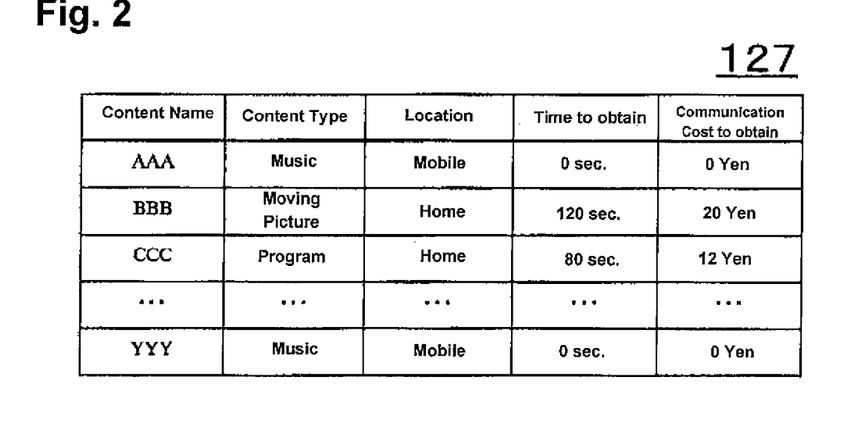
FIG. 2 is a diagram of an example of a contents selection screen according to the first embodiment.

FIG. 2 shows an example of a contents selection screen according to the present embodiment. The screen display device 127 displays a table shown in FIG. 2, and the user of the portable terminal 121 reviews this table to select contents that he or she wishes to view and/or hear or execute. The contents selection screen 127 displays names and types of contents, as well as locations of the contents. In FIG. 2, locations of contents stored in the portable terminal 121 are indicated as "mobile," while locations of contents stored in the contents server 101 are indicated as "home." Furthermore, the estimated time and estimated communication cost required to obtain each content are also displayed. The time and communication costs required to obtain contents already stored in the portable terminal 121 are indicated as zero, while time and communication costs of certain values are indicated for contents stored in the contents server 101. Due to the fact that the usable communication path changes with the position of the portable terminal 121, the values displayed for the time and communication costs also vary depending on the position of the portable terminal 121.

By selecting contents that the user wants from the table, the user can easily select contents that are not stored in the portable terminal 121 and obtain the contents with an understanding beforehand regarding the time and communication costs required to obtain such contents.

Although the information is displayed in a table format according to the present embodiment example, the information may be displayed in other formats, such as a tree display, as long as the same information is made available to the user.

Figure 3:
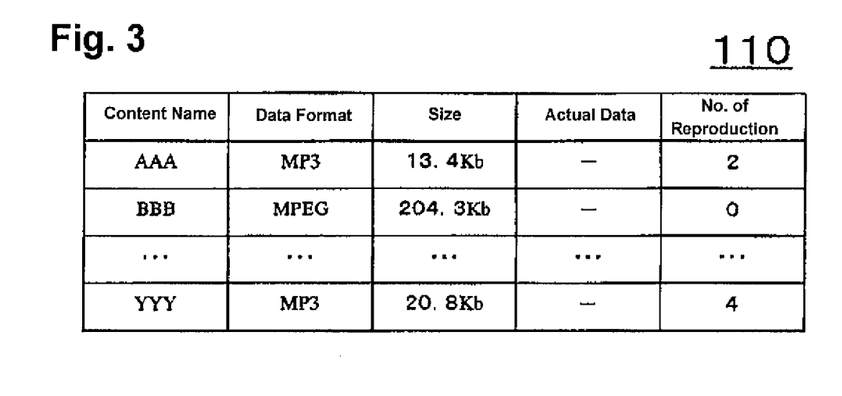
FIG. 3 is a diagram of details of a contents database 110.

FIG. 3 shows the details of the contents database 110, which is stored in the contents server 101. Information such as data format, size, actual data and the number of times the content has been reproduced is stored for each content. The contents transmission program 109 searches the contents database 110 for a content requested by the portable terminal 121 and sends the content found.

Figure 4:
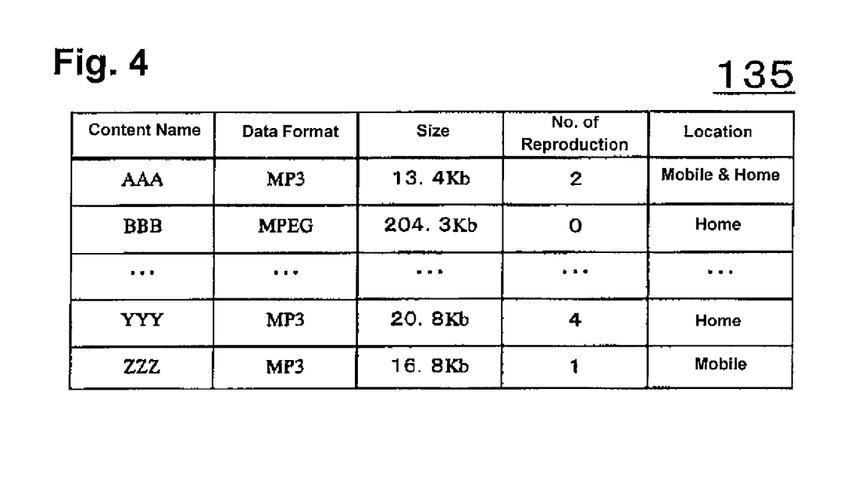
FIG. 4 is a diagram of details of a contents list 135 according to the first embodiment.

FIG. 4 shows the details of the contents list 135, which is stored in the portable terminal 121. The contents list 135 has a data structure similar to that of the contents database 110, but the contents list 135 differs from the contents database 110 in that the contents list 135 does not contain actual data of contents and instead contains the locations of the contents. In addition to information regarding actual data stored in the contents file 134 of the portable terminal 121, the contents list 135 also contains information regarding contents stored in the contents database 110 of the contents server 101. A content "AAA" in FIG. 4 is data stored in both the portable terminal 121 and the contents server 101, while contents "BBB" and "YYY" are not stored in the portable terminal 121 but in the contents server 101. In contrast, a content "ZZZ" is not stored in the contents server 101 but is stored in the portable terminal 121.

When a new content is written to the contents file 134, which has a small capacity, the capacity is sometimes insufficient. The information regarding the number of times the content has been reproduced, which is stored in the contents database 110 and contents list 135, is used to selectively delete contents that appear to be unnecessary in order to gain storage regions. Furthermore, contents such as "ZZZ" that are not stored in the contents server 101 can be copied on the contents server 101 using one of the communication paths before they are deleted; this makes the contents file 134 available for use without losing the contents "ZZZ."

Figure 5:
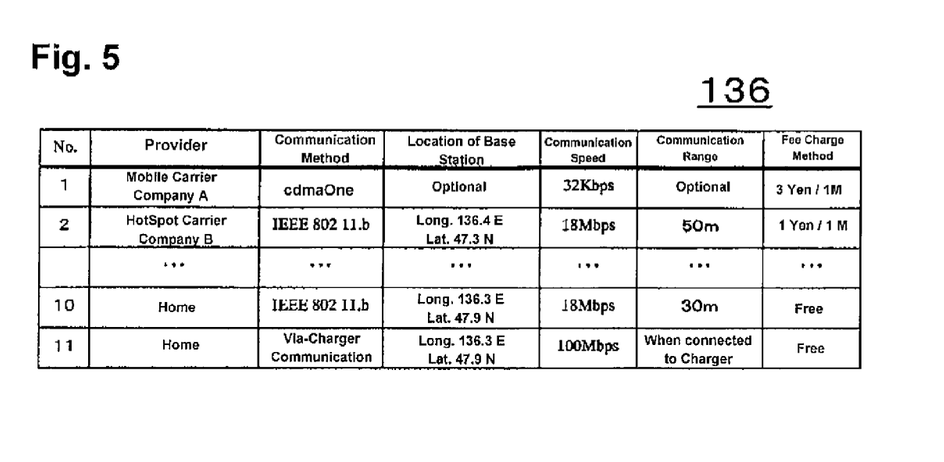
FIG. 5 is a diagram of details of a communication path information list 136.

FIG. 5 shows the details of the communication path information list 136, which is stored in the portable terminal 121. The communication path information list 136 stores information regarding communication paths that correspond to the communications devices 122, 123 and 124 that the portable terminal 121 has. Item No. 1 indicates information regarding a communication path using the wide area wireless communications device 122. This designates a communication method that is based on numerous base stations and that is used for portable telephones; there are basically no limits on communicatable positions and ranges, and the fee charge method is fixed. Items No. 2 through No. 10 indicate information regarding communication paths using the local wireless communications device 123. Since communication takes place in proximity of base stations placed locally, the applicable base station changes depending on the position of the portable terminal 122, which results in changes in fee charge methods. In the example shown in FIG. 5, a communication path offered for a fee is indicated in No. 2, while a communication path offered for free that is installed at home is indicated in No. 10. No. 11 shows information regarding a communication path that uses the local wire communications device 124. In this case, a wire communication path via a charger is designated. Compared to other communication paths, the communication speed of No. 11 is faster and communication is free, but communication through this communication path can take place only when the portable terminal 121 is connected to the charger.

Figure 6:
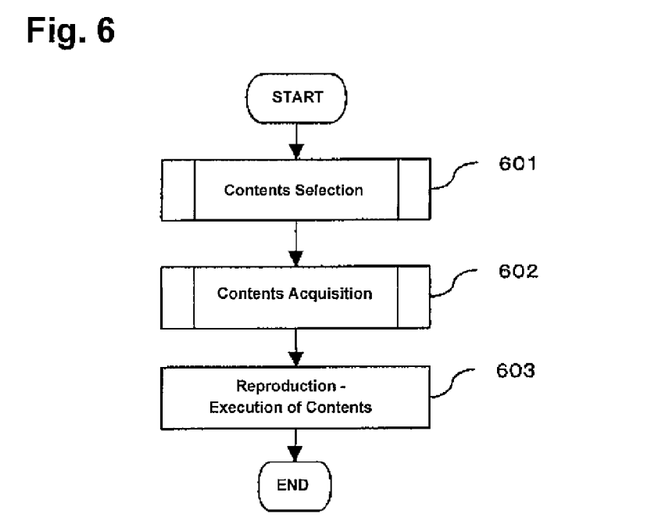
FIG. 6 is a diagram of an overall processing procedure in accordance with an embodiment of the present invention.

FIG. 6 shows an overall flow of a processing according to the present embodiment example.

Step 601:

The user of the portable terminal 121 activates the contents selection program 131 and selects a content. The contents selection program 131 displays a contents list shown in FIG. 2 and the user selects a content from this list. The details of this processing procedure will be described later using FIG. 7.

Step 602:

The portable terminal 121 obtains the content selected in step 601 in order to reproduce or execute the content. If the content selected is not in the contents file 134, the portable terminal 121 obtains the content from the contents server 101. The details of this processing procedure will be described later using FIG. 8.

Step 603:

The portable terminal 121 reproduces or executes the content obtained.

Figure 7:
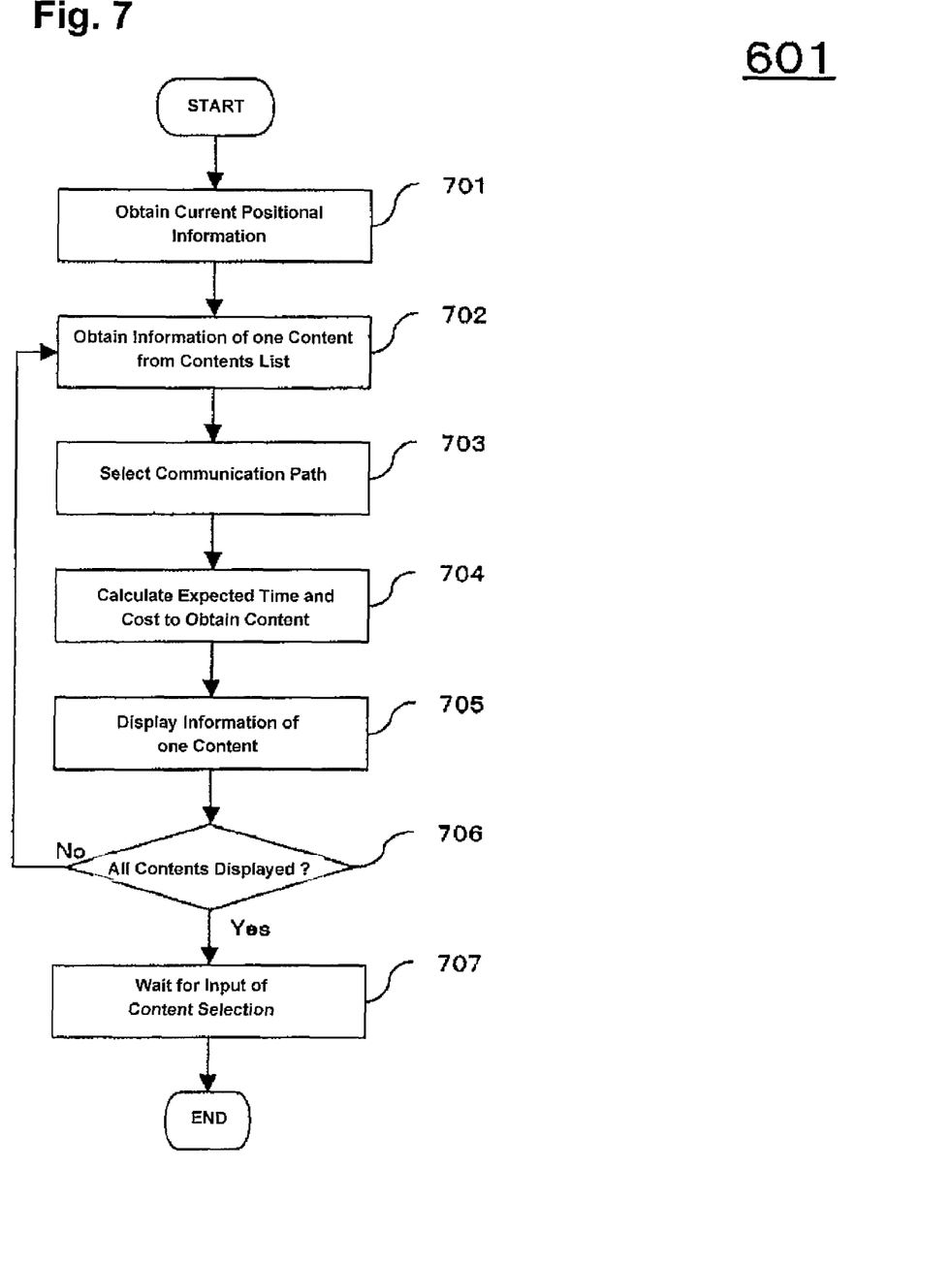
FIG. 7 is a diagram of details of a contents selection procedure 601.

FIG. 7 shows the detailed procedure for the content selection step 601.

Step 701:

The portable terminal 121 uses the position measuring device 129 to obtain the current position of the portable terminal 121.

Step 702:

Information of one content that is the subject of the processing is obtained from the contents list 135.

Step 703:

The current position of the portable terminal 121 that was obtained in step 701 and positional information of the content obtained in step 702 are provided to the communication path selection program 132 for the selection of a communication path. First, communication paths that are currently usable are selected from the communication path information list 136. If there is a plurality of usable communication paths, the path with the most inexpensive communication cost and fastest communication speed is selected. If there is a plurality of communication paths in which either the communication cost or communication speed is more advantageous than the other, information regarding a path to be given priority for use, i.e., whether the communication cost or the communication speed is given priority for use, that was inputted by the user in advance is used to decide on a communication path.

Step 704:

The time required to obtain the content is estimated based on the communication speed of the path selected and the size of the content selected. For example, one method for doing this is to divide the content size by the communication speed to obtain the communication time. Additionally, the communication cost required to obtain the content is estimated based on the fee charge method of the path selected and the size of the content selected. For example, one method for doing this is to divide the content size by the communication Cost per information volume to obtain the communication cost.

Step 705:

Information such as the content name and location included in the contents list 135, as well as the estimated time and estimated cost to obtain the content from step 704, is displayed on the screen and presented to the user.

Step 706:

If the processing is completed for all content items included in the contents list 135, the processing proceeds to step 707. If there are contents that have yet to be processed, the processing returns to step 702.

Step 707:

The processing enters a state of waiting for the user to input a content selection, and the processing is terminated. Based on the selection made by the user, step 602 in FIG. 6 is begun.

Based on the processing described above, data shown in FIG. 2 can be presented to the user. Since the details of contents that are stored not only in the portable terminal 121 but also in the contents server 101 are displayed, the user has a wider selection of contents to choose from. Furthermore, since contents can be selected based on information displayed in step 705, the user can make decisions without worrying about time or communication costs required to obtain contents.

Figure 8:
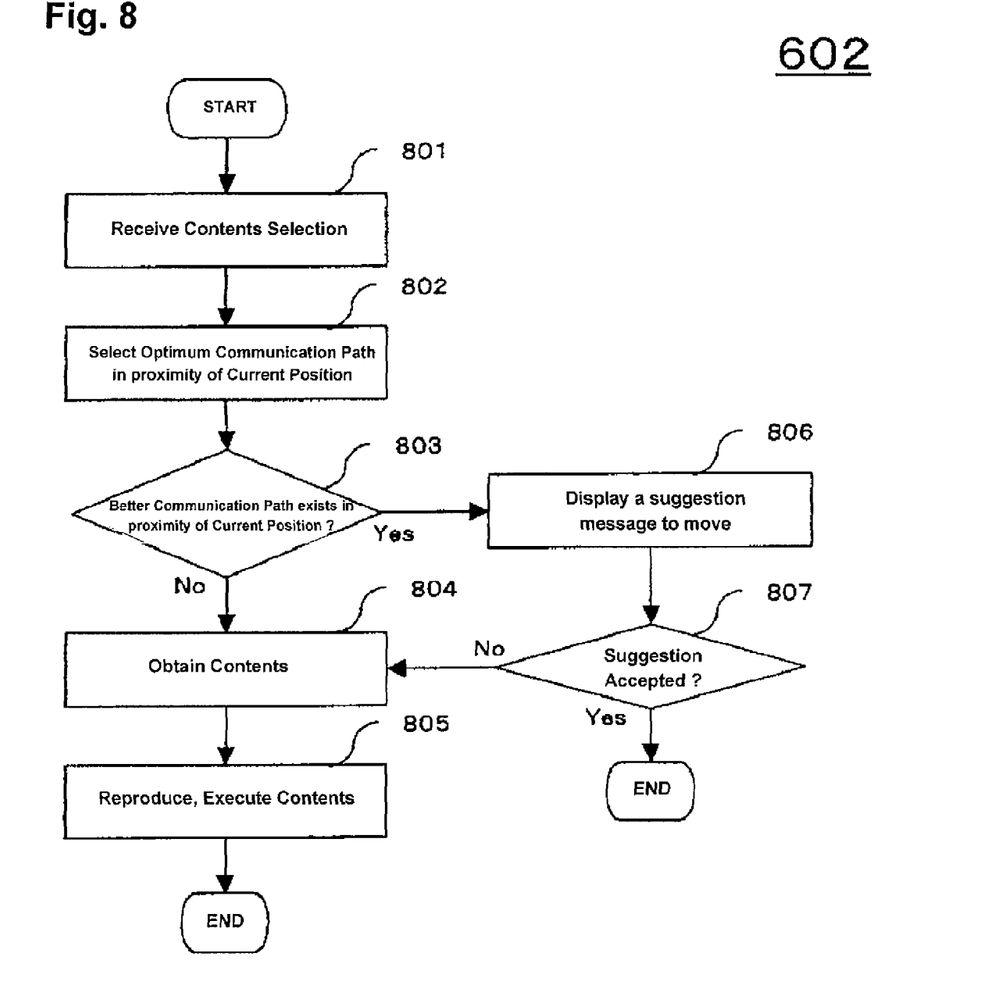
FIG. 8 is a diagram of details of a contents obtaining procedure 602.

FIG. 8 shows the detailed procedure for the content obtaining step 602.

Step 801:

The portable terminal 121 receives the information inputted by the user at the end of the content selection step 601 and identifies the content selected by the user.

Step 802:

Using the communication path information list 136 and the position measuring device 129, the communication path selection program 182 is executed to search communication paths with a communication range in proximity of the current position of the portable terminal 121, within a 50 m radius for example.

Step 803:

If a communication path that provides faster and/or more inexpensive connection than the communication path selected in step 703 is found in step 802, the processing proceeds to step 806. If not, the processing proceeds to step 804.

Step 804:

The contents server 101 is accessed by using the communication path selected in step 703, and the actual data of the content selected is obtained and stored in the contents file 134. At the same time, the details of the contents list 135 are changed. If there is insufficient capacity to store the content, data with a low number of times the content has been reproduced is deleted from the contents file 134. If data that is not stored in the contents server 101 is to be deleted, the data may be deleted after sending the data to the contents server 101 to create a backup.

Step 805:

The content obtained in step 804 is reproduced or executed.

Step 806:

The fact that a communication area that is faster and/or more inexpensive is available nearby is presented to the user, and moving to the area with the portable terminal 121 is suggested to the user. For example, a message "There is a high-speed access point at a distance of three minutes on foot from here (cost for obtaining content: 20 yen; time for obtaining content: 10 seconds). Do you want to move?" can be displayed with YES and NO buttons. The user selects whether to accept the suggestion by pressing a relevant one of the buttons.

Step 807:

If the user elects to accept the suggestion to move that was presented in step 806, the processing is terminated without obtaining the content. The present embodiment example assumes that the user would re-select the content after moving to the new location. Alternatively, the portable terminal 121 can detect that the move has ended and obtain the content using the communication path found in step 802. If the user does not accept the suggestion to move as presented, the processing proceeds to step 804.

As described earlier, if there is an area close to the current location where the user can communicate more advantageously, a processing to present this information to the user is realized according to the present embodiment example. For example, if the user is close to a business establishment that offers a local wireless communications service, the portable terminal 121 according to the present embodiment example can suggest the user to stop at the business establishment or suggest a wire communication upon going home if the user is close to home. As a result, the user can use a more advantageous communication path that utilizes communication functions of the portable terminal 121.

Figure 12:
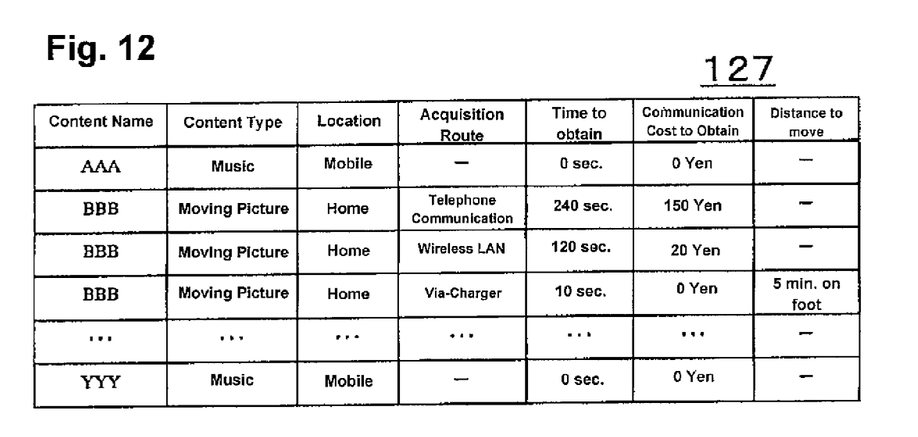
FIG. 12 is a diagram of another example of a contents selection screen according to the first embodiment.

Although the portable terminal 121 may suggest moving to another location nearby after the user selects a content as described above, the portable terminal 121 can alternatively present in advance communication paths that involve moving to another location nearby, as well as other communication paths. FIG. 12 shows an example of a screen presenting such communication paths. A content "BBB" can be obtained via three paths: telephone communication, wireless LAN and charger. The time and communication cost required to obtain the content is indicated for each, as well as the amount of time required to move if a move is required. The user can take into consideration the amount of time and cost required to obtain the content, as well as the amount of time required for a move, when selecting a content and a path to obtain the content from the List at the same time.

The first embodiment example of the present invention has shown that a user can select more contents and do so without worrying about time and communication costs required to obtain the contents, and select more advantageous communication paths using the positional information of the portable terminal.

A second embodiment of the present invention is described below with reference to FIGS. 6 through 11. In the second embodiment example, a contents server 101 is installed in a contents distribution company.

Figure 9:
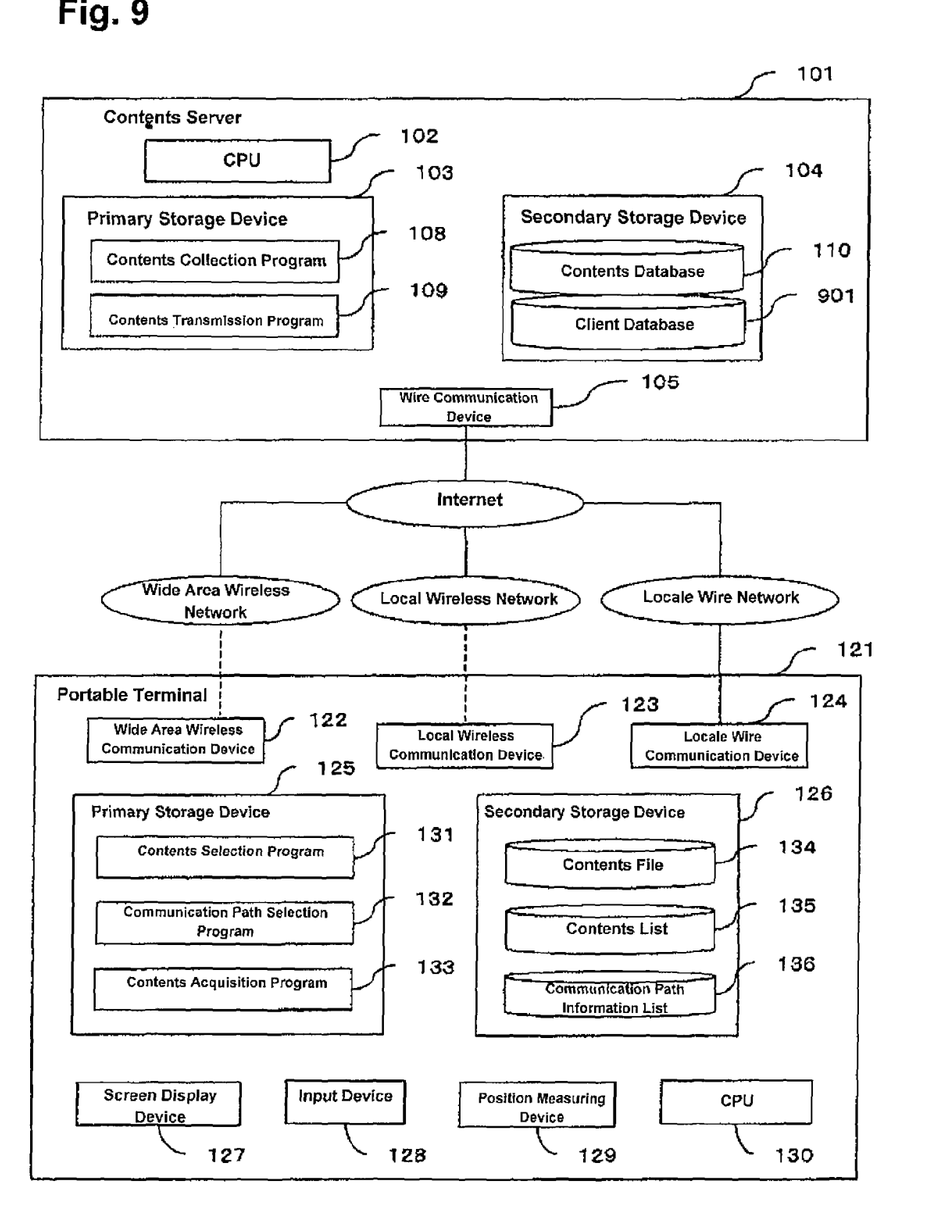
FIG. 9 is a diagram of a system configuration in accordance with a second embodiment of the present invention.

FIG. 9 shows, as in the first embodiment example, the overall configuration of a system according to the second embodiment example. Although the configuration of the system is generally the same as the system shown in FIG. 1, the mode of networks that connect the contents server 101 with a portable terminal 121 is different. It is noted however that the second embodiment example is the same as the first embodiment example in that the portable terminal 121 communicates with the contents server 101 via a plurality of communications devices.

Unlike the first embodiment example, the contents server 101 has a client database 901 inside a secondary storage device. Preferences of a user of the portable terminal 121 are registered in the client database 901 in advance. Based on the client database 901 and a contents database 110, a contents list 135 customized for each user is created and sent to the portable terminal 121.

Figure 10:
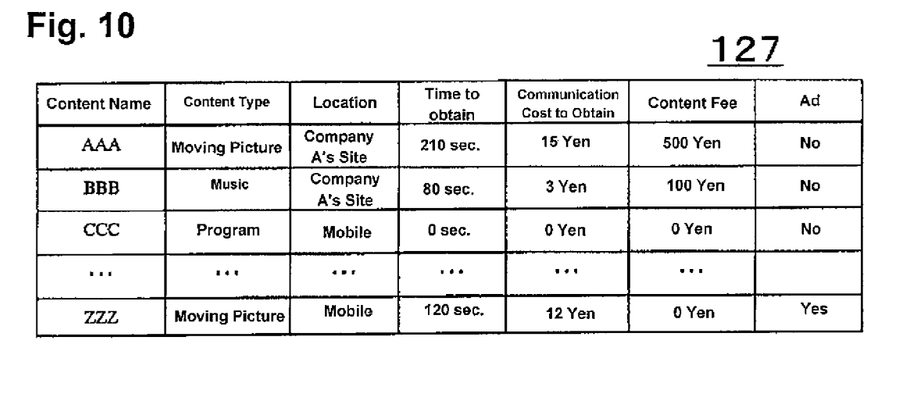
FIG. 10 is a diagram of a contents selection screen according to the second embodiment.

FIG. 10 shows a content selection screen according to the present embodiment example. As in the first embodiment example, the user can select contents not stored in the portable terminal 121 but in the contents server 101; the user can decide whether to obtain contents upon reviewing the content names and content types, as well as locations of the contents, the amount of time required to obtain the contents, and the communication costs required to obtain the contents. However, in the present embodiment example, information regarding content fee and whether or not there are advertisements (Ad) in the contents is also provided. Based on this information, the user can determine the total cost required to obtain each content as a sum of communication cost and content fee. Furthermore, the user can elect to obtain contents with lower costs by selecting contents with advertisements. In this way, the user can decide whether to purchase contents by taking into consideration not only the communication cost, but also more detailed costs required to obtain contents.

Figure 11:
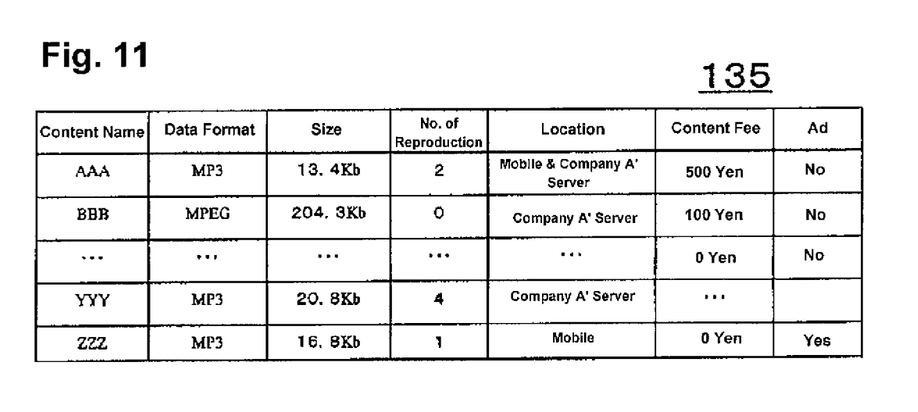
FIG. 11 is a diagram of contents of a contents list 135 according to the second embodiment.

FIG. 11 shows the details of the contents list 135 according to the second embodiment example. As in the first embodiment example, not only contents in the portable terminal 121 but also contents in the contents server 101 are included in the contents list 135 according to the second embodiment example. However, instead of showing on the contents list 135 all contents in the contents server 101, the contents shown are limited to data that match the client's preferences based on the client database 901; this results in restricting the amount of data in the contents list 135, while at the same time satisfying the user's needs. Furthermore, the contents list 135 also includes information regarding content fee and whether there are advertisements in the contents in order to display information shown in FIG. 10.

The processing flow to select, obtain, and reproduce or execute contents according to the system of the second embodiment is shown in FIGS. 6 through 8, as in the first embodiment example.

As described above, by applying the present invention to a system in which contents are obtained from the contents server 101 installed in the contents distribution company, the present embodiment example shows that a user can select more contents without being concerned about time and communication costs required to obtain the contents, and select more advantageous communication paths using the positional information of the portable terminal, according to the present invention.

As described above, the following effects can be obtained through the portable terminal and the contents distribution method according to the present invention:

(1) When obtaining contents using a portable terminal with a plurality of communication functions such as wireless and wired communications, the amount of time and costs required to obtain contents can be presented clearly, so that a user can make decisions regarding selection of contents without any concern.

(2) By utilizing positional information of the portable terminal, more advantageous communication paths can be easily selected.

Through the effects described above, the user can more freely select contents and view and/or hear or execute contents.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:
1. A portable terminal, comprising:
    a memory that stores a first content;
        a processor that reproduces or executes the first content stored in the memory;
        a communicator that communicates with a distribution server storing a second content;
        a display that displays an identifier of the first content stored in the memory and an identifier of the second content stored in the distribution sever;
        an operation unit that allows a user of the portable terminal to select one of the first content and second content by selecting one of a plurality of identifiers that are displayed by the display; and
        a controller that controls the memory, the processor, the communicator, the display and the operation unit, wherein the controller selects a method to obtain the content to be selected from a plurality of methods based on the content and cost or speed before the content is selected with the operation unit;

the controller controls the processor to obtain the first content stored in the memory in the selected method and reproduce or execute the obtained content if the first content stored in the memory is selected with the operation unit, and controls the communicator to obtain the second content stored in the distribution server in the selected method and reproduce or execute the obtained content if the second content stored in the distribution server is selected with the operation unit; and the controller controls the display to display a message suggesting a moving to an area if a more inexpensive or faster method to obtain the selected content with the operation unit than the selected method is available in the area and the area exists in proximity to a current position of the portable terminal.

2. The portable terminal according to claim 1, wherein the display displays a distinguish information with the identifier that distinguishes the first content stored in the memory with the second content stored in the distribution server.

3. The portable terminal according to claim 2, wherein the memory stores the obtained content that is obtained by the communicator, and the display changes an indication of the distinguish information of the obtained content.

4. The portable terminal according to claim 1, wherein the first content stored in the memory or the second content stored in the distribution server is a music data, a picture data, or a program date.

5. The portable terminal according to claim 1, further comprising:
a position measure that provides a current position information of the portable terminal; and
a calculator that calculates the cost or the time based on the current position information provided by the position measure.

6. The portable terminal according to claim 1, wherein the controller controls the display to display the identifier with information that indicates the communication cost to obtain the second content stored in the distribution server via the selected communication network.

7. The portable terminal according to claim 1, wherein the controller controls the memory to delete a stored content selected based on a number of reproduction times when the second content in the distribution server is selected with the operation unit and there is not sufficient capacity to store the obtained content in the memory.

8. The portable terminal according to claim 7, wherein the controller controls the memory to delete the stored content after the stored content is transmitted to the distribution server if the stored content is not stored in the distribution server.

9. The portable terminal according to claim 1, wherein the controller controls the display to display the identifier with information regarding existence of advertisements in the first or second content before the first or second content is selected with the operation unit.

10. The portable terminal according to claim 1, wherein the display displays information that indicates a content purchase fee of the second content before obtaining the second content.

11. The portable terminal according to claim 1, wherein the communicator communicates with the distribution server via a plurality of communication networks that communicate at respective speeds, and obtains the second content stored in the distribution server via a selected communication network from the plurality of communication networks.

* * * * *

UNITED STATES PATENT AND TRADEMARK OFFICE
CERTIFICATE OF CORRECTION

PATENT NO. : 8,099,136 B2  
APPLICATION NO. : 12/698846  
DATED : January 17, 2012  
INVENTOR(S) : Kawasaki et al.

Page 1 of 1

It is certified that error appears in the above-identified patent and that said Letters Patent is hereby corrected as shown below:

Claim 1, at column 10, line 60, after the word "distribution", delete "sever" and insert therefor -- server --.

Signed and Sealed this
Third Day of July, 2012

David J. Kappos
*Director of the United States Patent and Trademark Office*